(12) United States Patent
Ahmed et al.

(10) Patent No.: US 11,391,464 B2
(45) Date of Patent: Jul. 19, 2022

(54) ENHANCED PELLET FUELED COOKING DEVICE

(71) Applicant: W.C. BRADLEY CO., Columbus, GA (US)

(72) Inventors: Mallik Ahmed, Columbus, GA (US); Bruce Roberts, Midland, GA (US); Ramin Khosravi Rahmani, Columbus, GA (US); Anthony Hamilton, Hamilton, GA (US); Sleiman Abdallah, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 38 days.

(21) Appl. No.: 16/799,244

(22) Filed: Feb. 24, 2020

(65) Prior Publication Data
US 2020/0370752 A1   Nov. 26, 2020

Related U.S. Application Data

(60) Provisional application No. 62/810,003, filed on Feb. 25, 2019.

(51) Int. Cl.
| | |
|---|---|
| *F24B 1/02* | (2006.01) |
| *F24B 1/08* | (2021.01) |
| *F24B 13/04* | (2006.01) |
| *F24B 13/02* | (2006.01) |
| *F24B 5/02* | (2006.01) |

(52) U.S. Cl.
CPC ............ *F24B 1/026* (2013.01); *F24B 1/08* (2013.01); *F24B 5/023* (2013.01); *F24B 13/02* (2013.01); *F24B 13/04* (2013.01)

(58) Field of Classification Search
None
See application file for complete search history.

(56) References Cited

U.S. PATENT DOCUMENTS

| | | | |
|---|---|---|---|
| 2,910,930 A | 11/1959 | Hankoff | |
| 3,623,422 A | 11/1971 | Marshall | |
| 4,665,891 A * | 5/1987 | Nemec | A23B 4/052 126/25 R |
| 4,810,510 A | 3/1989 | Lever et al. | |
| 4,823,684 A * | 4/1989 | Traeger | A47J 37/0704 126/10 |
| 4,909,235 A | 3/1990 | Boetcker | |
| 4,966,126 A | 10/1990 | Wu | |

(Continued)

FOREIGN PATENT DOCUMENTS

| | | |
|---|---|---|
| AT | 402850 B | 9/1997 |
| CN | 103989414 B | 5/2016 |

(Continued)

OTHER PUBLICATIONS

May 7, 2020, Publisher: International Search Report issued by the ISA/US for PCT/US2020/020487 dated May 7, 2020.

*Primary Examiner* — David J Laux
(74) *Attorney, Agent, or Firm* — David G. Woodral; GableGotwals

(57) ABSTRACT

A cooking system having a pellet fueled cooking chamber, a fire chamber held in a fixed relationship with respect to the cooking chamber, and a user adjustable port that selectively allows fluid communication from the fire chamber to the cooking chamber.

18 Claims, 8 Drawing Sheets

(56) References Cited

U.S. PATENT DOCUMENTS

| | | | |
|---|---|---|---|
| 5,251,607 A | 10/1993 | Traeger et al. | |
| 5,429,110 A | 7/1995 | Burke et al. | |
| 5,490,452 A | 2/1996 | Schlosser et al. | |
| 5,809,991 A | 9/1998 | Pai | |
| 6,187,359 B1 | 2/2001 | Zuccarini | |
| 6,209,533 B1 * | 4/2001 | Ganard | A47J 37/0704 126/25 R |
| 6,223,737 B1 | 5/2001 | Buckner | |
| 6,314,955 B1 | 11/2001 | Boetcker | |
| 7,530,351 B2 | 5/2009 | Leverty | |
| D623,013 S | 9/2010 | Alden et al. | |
| 7,900,553 B1 | 3/2011 | Maurin | |
| 7,984,709 B1 | 7/2011 | Byrnes et al. | |
| 8,267,078 B2 | 9/2012 | Kuntz | |
| D681,394 S | 5/2013 | Parel et al. | |
| 8,651,018 B1 * | 2/2014 | Loud, III | A47J 37/0704 99/482 |
| 8,899,145 B2 | 12/2014 | Harrison et al. | |
| 8,985,092 B2 | 3/2015 | Ahmed | |
| D760,539 S | 7/2016 | Colston | |
| 9,427,108 B2 | 8/2016 | Ahmed | |
| 9,441,838 B2 | 9/2016 | Baker | |
| 9,635,978 B2 * | 5/2017 | Measom | A47J 37/0704 |
| 9,759,429 B2 | 9/2017 | Tucker | |
| 9,814,354 B2 | 11/2017 | McAdams et al. | |
| 9,913,559 B2 | 3/2018 | Polter et al. | |
| D817,091 S | 5/2018 | Colston | |
| 10,201,247 B1 | 2/2019 | Jones | |
| 10,292,531 B1 * | 5/2019 | Hancock | A23B 4/0523 |
| 10,495,317 B1 * | 12/2019 | Hancock | F24C 11/00 |
| 2004/0226550 A1 * | 11/2004 | Hutton | A23B 4/052 126/25 R |
| 2005/0126556 A1 | 6/2005 | Bossler | |
| 2009/0056695 A1 | 3/2009 | Cosgrove | |
| 2009/0293860 A1 | 12/2009 | Carlson | |
| 2010/0218754 A1 | 9/2010 | Kuntz | |
| 2011/0073101 A1 | 3/2011 | Lau et al. | |
| 2011/0136066 A1 | 6/2011 | Geselle et al. | |
| 2011/0275023 A1 | 11/2011 | Knight | |
| 2013/0298894 A1 | 11/2013 | Kleinsasser | |
| 2014/0326232 A1 | 11/2014 | Traeger | |
| 2014/0326233 A1 | 11/2014 | Traeger | |
| 2014/0373827 A1 | 12/2014 | Zhu et al. | |
| 2014/0377431 A1 | 12/2014 | Kazerouni | |
| 2015/0079250 A1 * | 3/2015 | Ahmed | A23B 4/052 426/314 |
| 2015/0136109 A1 | 5/2015 | Baker | |
| 2015/0182074 A1 * | 7/2015 | Bucher | A47J 37/0786 99/445 |
| 2015/0320259 A1 | 11/2015 | Tucker | |
| 2016/0174767 A1 | 6/2016 | Schlosser et al. | |
| 2016/0245529 A1 | 8/2016 | McClean | |
| 2016/0255999 A1 * | 9/2016 | McAdams | A47J 37/0754 |
| 2016/0327263 A1 * | 11/2016 | Traeger | F24C 1/04 |
| 2017/0065124 A1 | 3/2017 | Colston | |
| 2017/0067649 A1 | 3/2017 | Colston | |
| 2017/0164783 A1 * | 6/2017 | Sauerwein | A47J 37/0786 |
| 2017/0196400 A1 | 7/2017 | Colston | |
| 2017/0198917 A1 * | 7/2017 | Gillespie | F24B 1/026 |
| 2017/0219213 A1 | 8/2017 | Measom et al. | |
| 2017/0289257 A1 | 10/2017 | Colston | |
| 2017/0343218 A1 | 11/2017 | Tucker | |
| 2017/0370592 A1 * | 12/2017 | Bogazzi | F24B 5/087 |
| 2018/0028018 A1 | 2/2018 | Barnett et al. | |
| 2018/0168397 A1 | 6/2018 | Colston | |
| 2018/0192822 A1 | 7/2018 | Cedar et al. | |
| 2018/0213970 A1 | 8/2018 | Colston | |
| 2018/0296031 A1 | 10/2018 | Terrell, Jr. et al. | |
| 2018/0317707 A1 * | 11/2018 | Dahle | A47J 37/0713 |
| 2018/0368617 A1 | 12/2018 | Allmendinger | |
| 2018/0368618 A1 | 12/2018 | Meason et al. | |
| 2019/0008321 A1 | 1/2019 | Allmendinger | |
| 2019/0290064 A1 * | 9/2019 | Colston | A47J 37/0704 |
| 2019/0290066 A1 | 9/2019 | Colston | |
| 2019/0365152 A1 * | 12/2019 | Dahle | A23L 5/15 |
| 2019/0374065 A1 * | 12/2019 | Hancock | A47J 37/0704 |
| 2020/0116349 A1 * | 4/2020 | Rahmani | A23B 4/052 |
| 2020/0158337 A1 * | 5/2020 | Baker | F23B 40/08 |
| 2020/0333011 A1 * | 10/2020 | Ahmed | A47J 37/0704 |

FOREIGN PATENT DOCUMENTS

| | | |
|---|---|---|
| DE | 4020171009570011 S | 6/2018 |
| WO | 2013116946 A1 | 8/2013 |
| WO | 2017044598 A1 | 3/2017 |
| WO | 2017064528 A1 | 4/2017 |
| WO | 2018125681 A1 | 7/2018 |
| WO | 2018208919 A1 | 11/2018 |

* cited by examiner

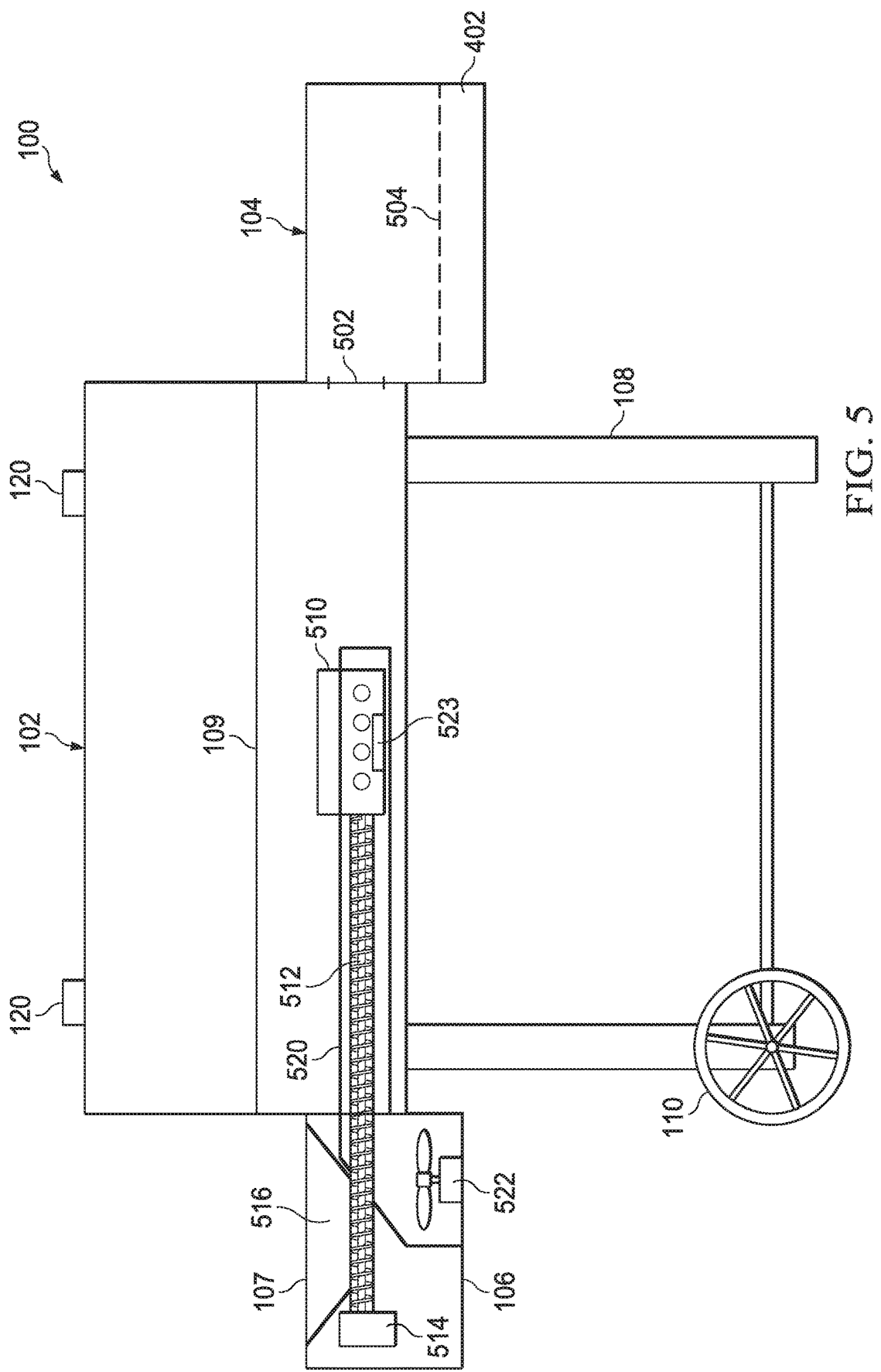

ENHANCED PELLET FUELED COOKING DEVICE

CROSS-REFERENCE TO RELATED CASES

This application claims the benefit of U.S. provisional patent application Ser. No. 62/810,003, filed on Feb. 25, 2019, and incorporates such provisional application by reference into this disclosure as if fully set out at this point.

FIELD OF THE INVENTION

This disclosure relates to cooking with solid fuels in general and, more specifically, selectively cooking with smoke or with higher heat combustion using solid fuels.

BACKGROUND OF THE INVENTION

Prior outdoor wood pellet fired cooking and smoking appliances are described, among other places, in U.S. Pat. Nos. 4,823,684 and 5,251,607, both to Joseph Traeger, et al. In some prior systems, an electrically driven auger transports small compressed wood pellets from an exterior hopper to a combustion chamber or firepot inside the device. The combustion chamber or firepot is supplied with combustion air pressurized and driven by an exterior fan through ductwork to an area surrounding the firepot and then though holes in the exterior of the firepot feeding air into the combustion space. The hot gas from the firepot travels to a cooking grate placed above the firepot in a cooking chamber.

Although the products such as these are often referred to as smokers, the action of the fan driven pressurized combustion air supplied to the firepot creates a very intense fire, owing in part to the pressurized air ensuring very complete combustion of the fuel. This high temperature combustion is essentially smokeless when the fire in the firepot is well established. However, with prior systems, limiting air intake to create incomplete combustion, and therefore smoke, drastically reduces the heat output of the fire and runs the risk of actually extinguishing the fire.

What is needed is a system and method for addressing the above and related issues.

SUMMARY OF THE INVENTION

The invention of the present disclosure, in one aspect thereof, comprises a cooking system having a pellet fueled cooking chamber, a fire chamber held in a fixed relationship with respect to the cooking chamber, and a user adjustable port that selectively allows fluid communication from the fire chamber to the cooking chamber.

In some embodiments, the system further comprises an adjustable exhaust valve on the cooking chamber for promoting or impeding flow of smoke from the fire chamber into the cooking chamber. An adjustable air inlet may be provided on the fire chamber. The system may include a hopper and a selectively operable auger for providing fuel pellets to the pellet fueled cooking chamber. In some cases a firepot is provided inside the cooking chamber that receives fuel pellets from the auger for combustion. A forced air fan may provide combustion air to the firepot.

The invention of the present disclosure, in another aspect thereof, comprises a system having a cooking chamber; a firepot inside the cooking chamber that is configured to burn solid fuel, and a fire chamber outside the cooking chamber and held in a fixed relationship with respect thereto. The system has an opening allowing fluid communication between the cooking chamber and fire chamber and having a first user adjustable vent for adjustment of the fluid communication, and a second user adjustable vent on the cooking chamber allowing for reduction of pressure inside the cooking chamber.

Some embodiment have an adjustable air inlet on the fire chamber. The system may include a hopper and selectively operable auger for providing fuel pellets to the firepot. A forced air fan may provide combustion air to the firepot.

The invention of the present disclosure, in another aspect thereof, comprises a system having a cooking chamber defining a space for cooking food, a firepot inside the cooking chamber configured to combust pelletized fuel, a hopper outside the cooking chamber configured to receive pelletized fuel, and an auger that transports pelletized fuel from the hopper to the firepot. The system includes a fire box outside the cooking chamber configured to produce smoke by combustion, and a port between the fire box and the cooking chamber allowing fluid flow from the fire box to the cooking chamber.

The system may include an adjustable vent on the port that selectively alters fluid flow from the fire box to the cooking chamber. A forced air fan and a conduit extending into the cooking chamber may supply forced combustion air to the firepot.

The port may enter the cooking chamber below a cooking grate in the cooking chamber and on an upper portion of the fire box. The system may include at least one smoke stack extending upwardly from on or near the top of the cooking chamber that removes smoke and combustion products from the cooking chamber.

At least one adjustable top vent may be provided on or near a top of the cooking chamber for selectively lowering pressure within the cooking chamber. At least one smoke stack may extend from the cooking chamber and terminated at a level above the at least one adjustable top vent. The combustion chamber may define an air inlet vent on an outside thereof and below the port, and may include a fuel grate in the combustion chamber situated above at least a portion of the air inlet vent and below at least a portion of the port. In at least some embodiments, the firepot is below the cooking grate.

BRIEF DESCRIPTION OF THE DRAWINGS

FIG. 5 is a cutaway view of the enhanced pellet fuel cooking device of FIG. 1.

DETAILED DESCRIPTION OF THE PREFERRED EMBODIMENTS

Figure 1:
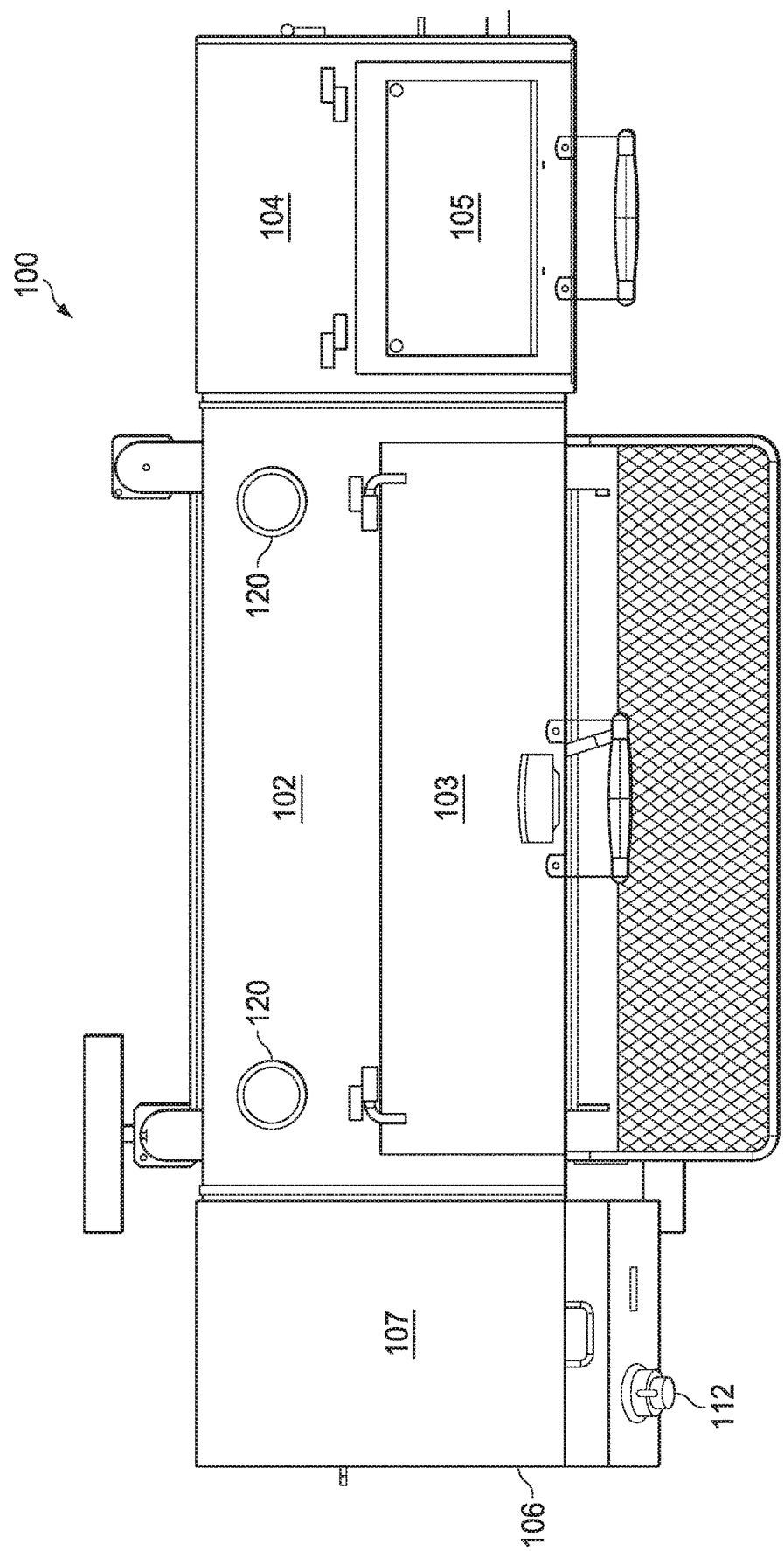
FIG. 1 is a top-down view of an enhanced pellet fuel cooking device according to aspects of the present disclosure.
Figure 2:
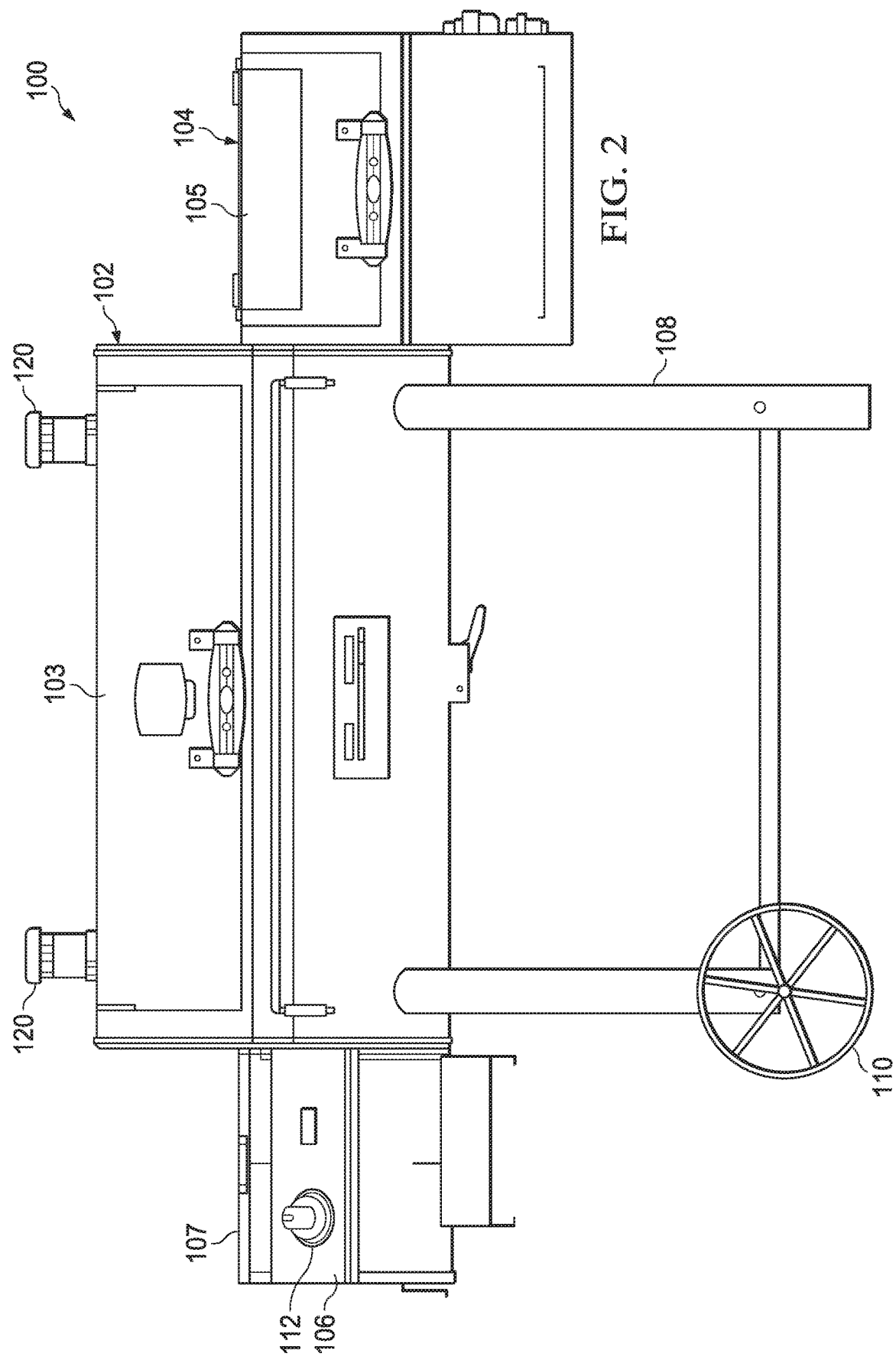
FIG. 2 is a front elevational view of the enhanced pellet fuel cooking device of FIG. 1.
Figure 3:
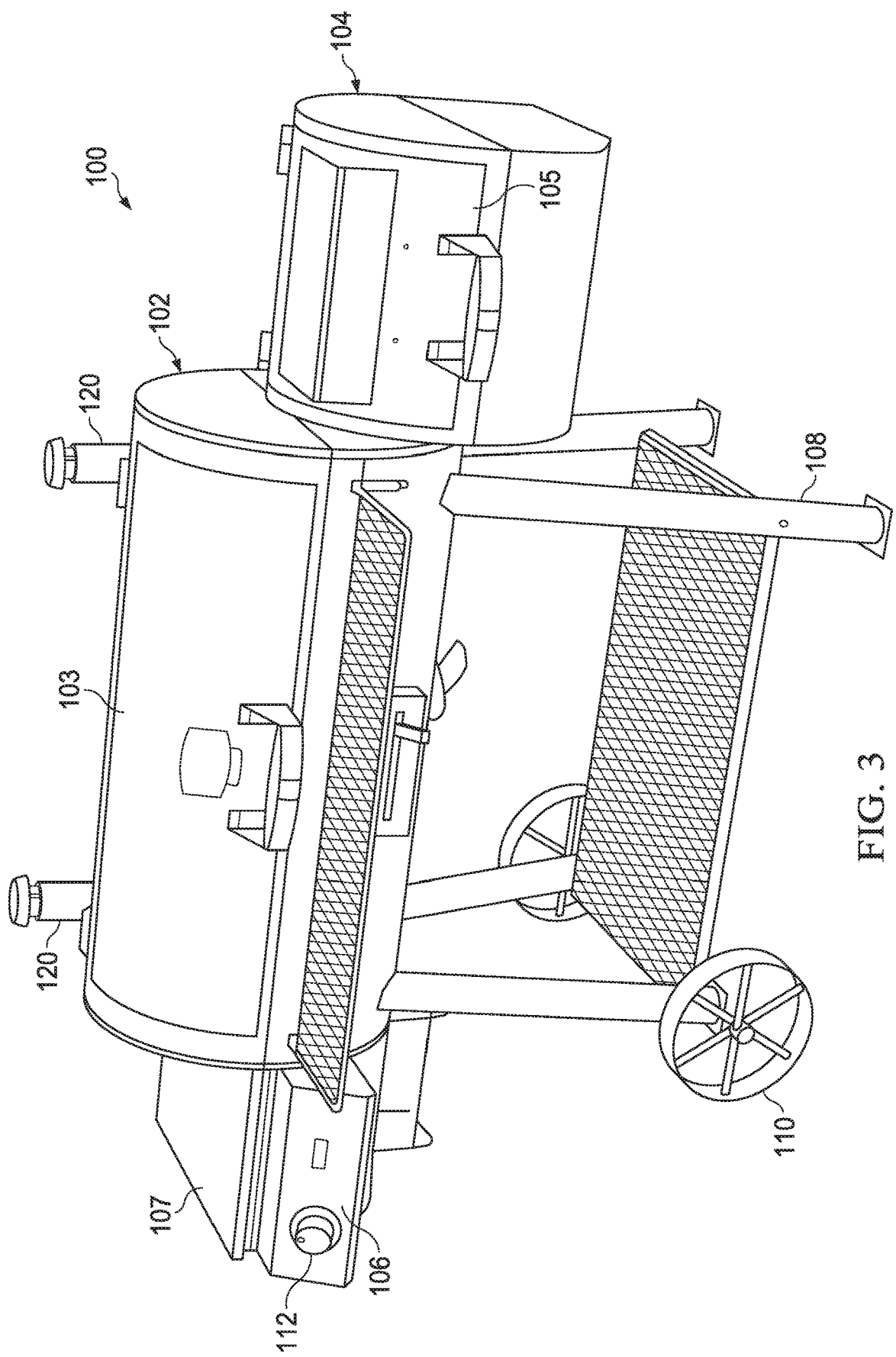
FIG. 3 is a perspective view of the enhanced pellet fuel cooking device of FIG. 1.
Figure 4:
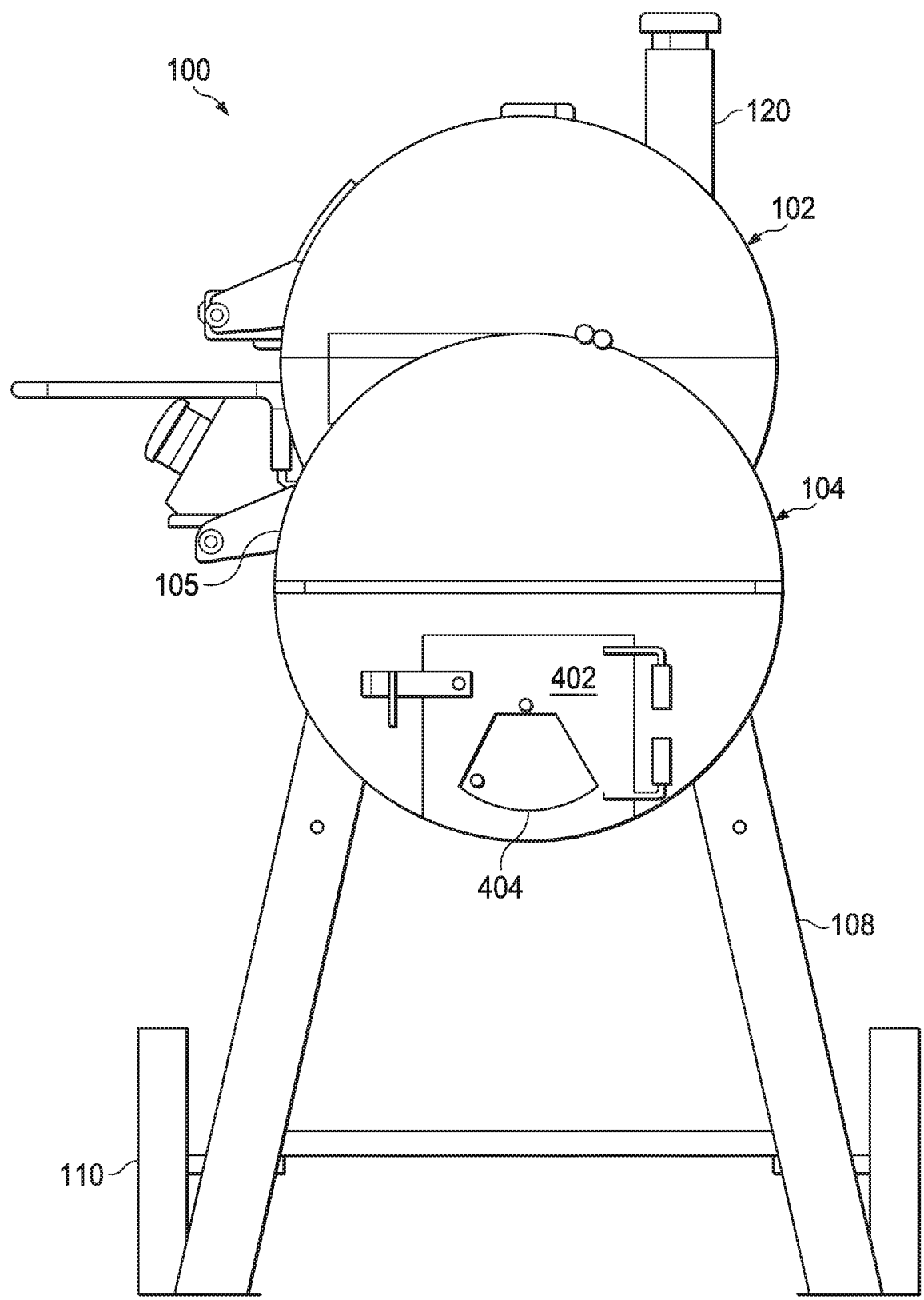
FIG. 4 is a right-side end view of the enhanced pellet fuel cooking device of FIG. 1.

Referring now to FIG. 1, a top-down view of an enhanced pellet fuel cooking device 100 according to aspects of the present disclosure is shown. FIG. 2 is a front elevational view of the enhanced pellet fuel cooking device 100. FIG. 3 is a perspective view of the enhanced pellet fuel cooking device 100. Completing the exterior views, FIG. 4 is a right-side end view of the enhanced pellet fuel cooking device 100.

In various embodiments, the cooking device 100 comprises a cooking chamber 102. An interior of the cooking chamber 102 may be accessible via an inset, hinged lid 103 or other doorway or closure mechanism. One or more cooking grates (e.g., 109, FIG. 5) may be provided within the cooking chamber 102. The cooking chamber 102 and/or other components of the system 100 may also be provided with supports 108 for placing operation and controls at an appropriate height for a user. One or more wheels 110 may also be provided to promote ease of movement of the system 100. The cooking chamber 102 is illustrated as having a generally cylindrical shape. However, it should be appreciated that other shapes and designs of the cooking chamber 102 are possible according to other embodiments.

The device 100 comprises a closable, lidded, combustion chamber or fire chamber 104 adjacently attached to a cooking chamber 102. The fire chamber 104 may be in the form of a horizontally-oriented cylinder (or other geometric shape), and may have an openable lid 105, that may be hinged and/or inset. In some embodiments, the fire chamber 104 is configured to burn solid fuel for production of smoke to be used for smoking of foods inside the cooking chamber 102. The interior configuration of the fire chamber 104 may be adapted to provide controllable burn of fuel and other smoke producing materials using natural draft and airflow (e.g., non-forced ventilation). In some embodiments a fuel grate 504 (FIG. 5) is provided to promote even burning. Hoppers, baffles and other internal components (not shown) may also be provided with the fire chamber 104. As further explained below an opening or port (502, FIG. 5) that selectively allows for smoke and gas flow (more generally, fluid flow) from the fire chamber 104 to the main cooking chamber 102 may also be defined at a junction between the cooking chamber 102 and fire chamber 104.

The system 100 may also comprise a pelletized fuel feeding system 106 that operates to provide a pellet-fueled fire inside a firepot 510 (FIG. 5) within the cooking chamber 102. A lid 107 may allow access to refill the fuel feeding system 106 with fuel pellets or other fuel. User controls 112 may be provided for activating and controlling pellet delivery, ignition, and other functions.

With further reference now to FIG. 5, illustrating a cutaway view of the enhanced pellet fuel cooking device 100 it can be seen that a fuel hopper 516 is accessed under the lid 107. The hopper holds a quantity of fuel pellets that are selectively fed via an auger 512 into the firepot 510. The auger 512 may be a screw type auger and may be powered by an electric motor 514. Combustion air may be fed into the firepot under positive pressure through a conduit 520, which may surround the auger or take another pathway to the firepot 510. An electrically driven fan 522 may pressurize air into the conduit 520. An electrically powered ignitor 523 may be within the firepot 510 itself for igniting, or reigniting, fuel pellets in the firepot. The motor 514, fan 522, and ignitor 523 may be powered by battery or household voltage with suitable wiring (not shown) and operable by the user via controls 112.

Figure 6A:
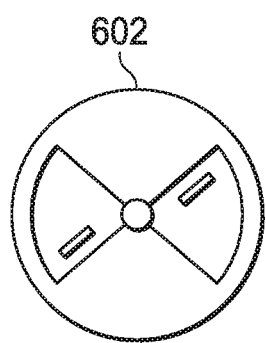
FIG. 6A illustrates a first vent adjustment mechanism suitable for use with the enhanced pellet fuel cooking device of FIG. 1.
Figure 6B:
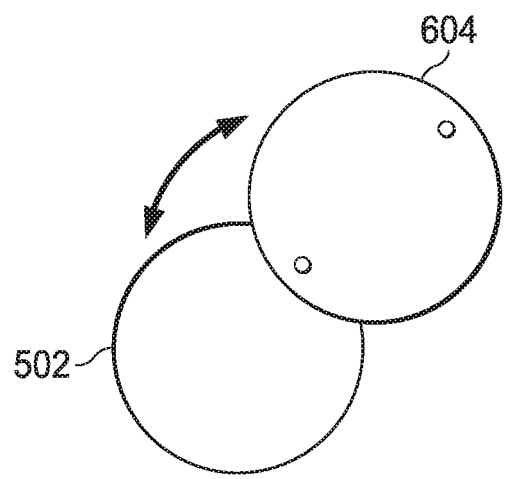
FIG. 6B illustrates a second vent adjustment mechanism suitable for use with the enhanced pellet fuel cooking device of FIG. 1.
Figure 6C:
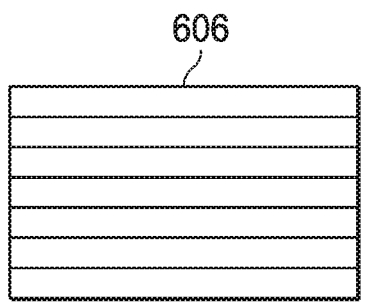
FIG. 6C illustrates a third vent adjustment mechanism suitable for use with the enhanced pellet fuel cooking device of FIG. 1.

As also seen in FIG. 5, an opening 502 may be provided between the fire chamber 104 and cooking chamber 102, which may be provided with an adjustable vent for selective opening, closing, or adjustment to a partially open/closed position by the user. Referring now also to FIGS. 6A, 6B, and 6C a plurality of adjustable opening or vent mechanisms suitable for use in or on the opening 502 are shown. The vent may comprise a butterfly vent 602 (FIG. 6A), a rounded opening 502 with a rotatable cover 604 (FIG. 6B), a shutter vent 606 (FIG. 6C), or another venting mechanism. It will be appreciated that the venting mechanism may be adjustable to allow user control over flow of smoke from the fire chamber 104 into the cooking chamber 102. In some embodiments, the venting mechanism may be adjustable from outside the fire chamber 104 and/or the cooking chamber 102. Various levers, slides, dials, etc. may be connected the adjustable vent by linkages to allow internal adjustment of the venting mechanism or valve, even when cooking operations are already underway. In other embodiments, the port 502 may be part of or defined by a conduit or other pathway interposing the cooking chamber 102 and the fire chamber 104.

With reference now again to FIG. 4, the fire chamber 104 may be provided with a door 402 that is accessible outside the cooking device 100. In some embodiments, fuel is added via the lid 105 while the door 402 may be used to remove ashes or for cleaning. The door 402 may also provide an adjustable intake vent 404 that may be used in conjunction with the adjustable opening 502 to control both combustion and smoke production within the fire chamber 104 and the amount of smoke and heat allowed to exit the fire chamber 104 and enter into the cooking chamber 102. By correct adjustment of smoke stacks 120 on the main cooking chamber 102, smoke from the fire chamber 104 is admitted to the cooking chamber to flavor the food while cooking is done with relative rapidity due to the high heat output of the fire pot 510. In some embodiments, smoke stacks 120 have valves, dampers, or other adjustment mechanisms to control gas flow.

Figure 7:
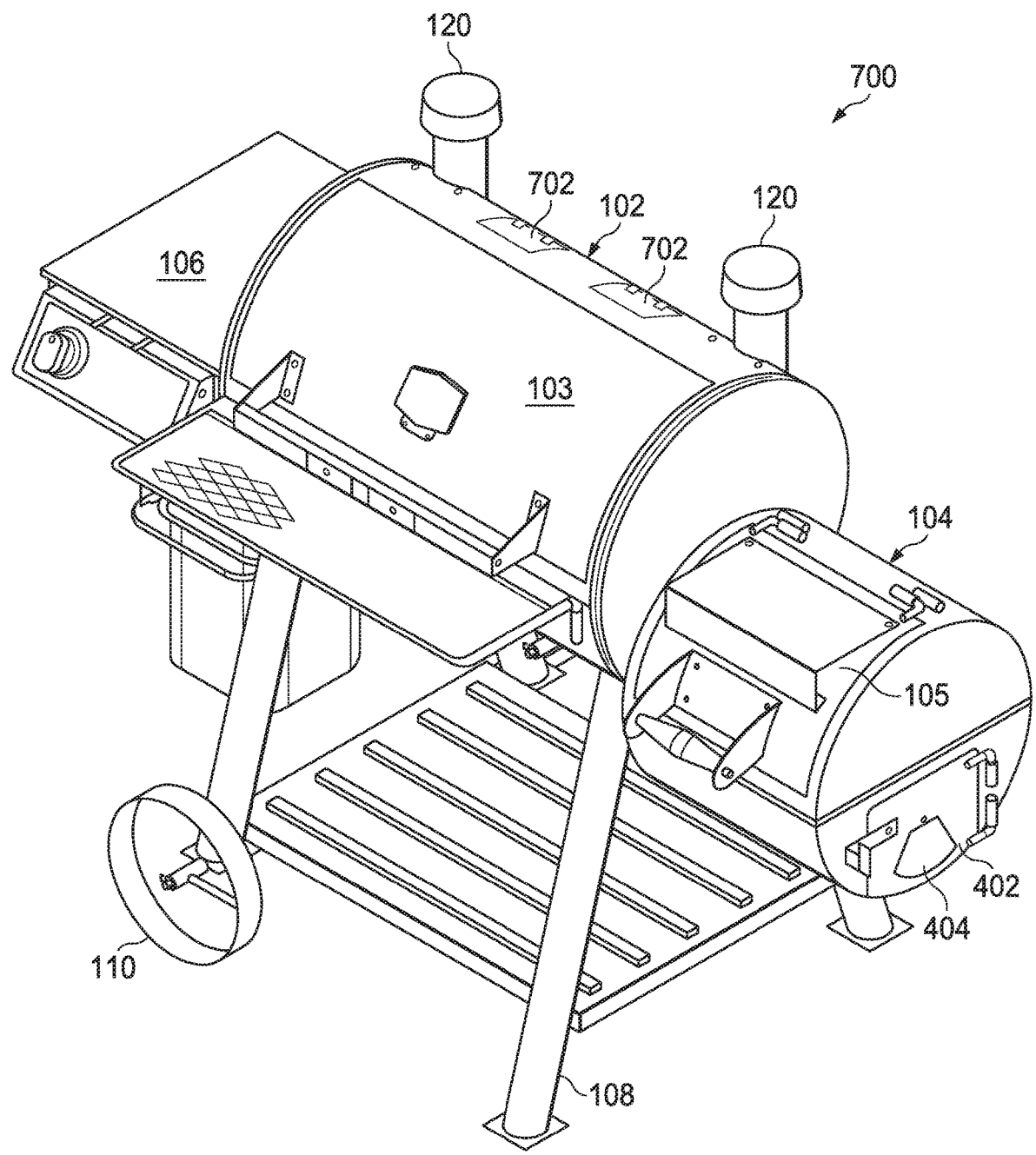
FIG. 7 is a perspective view of another embodiment of an enhanced pellet fuel cooking device according to aspects of the present disclosure.
Figure 8:
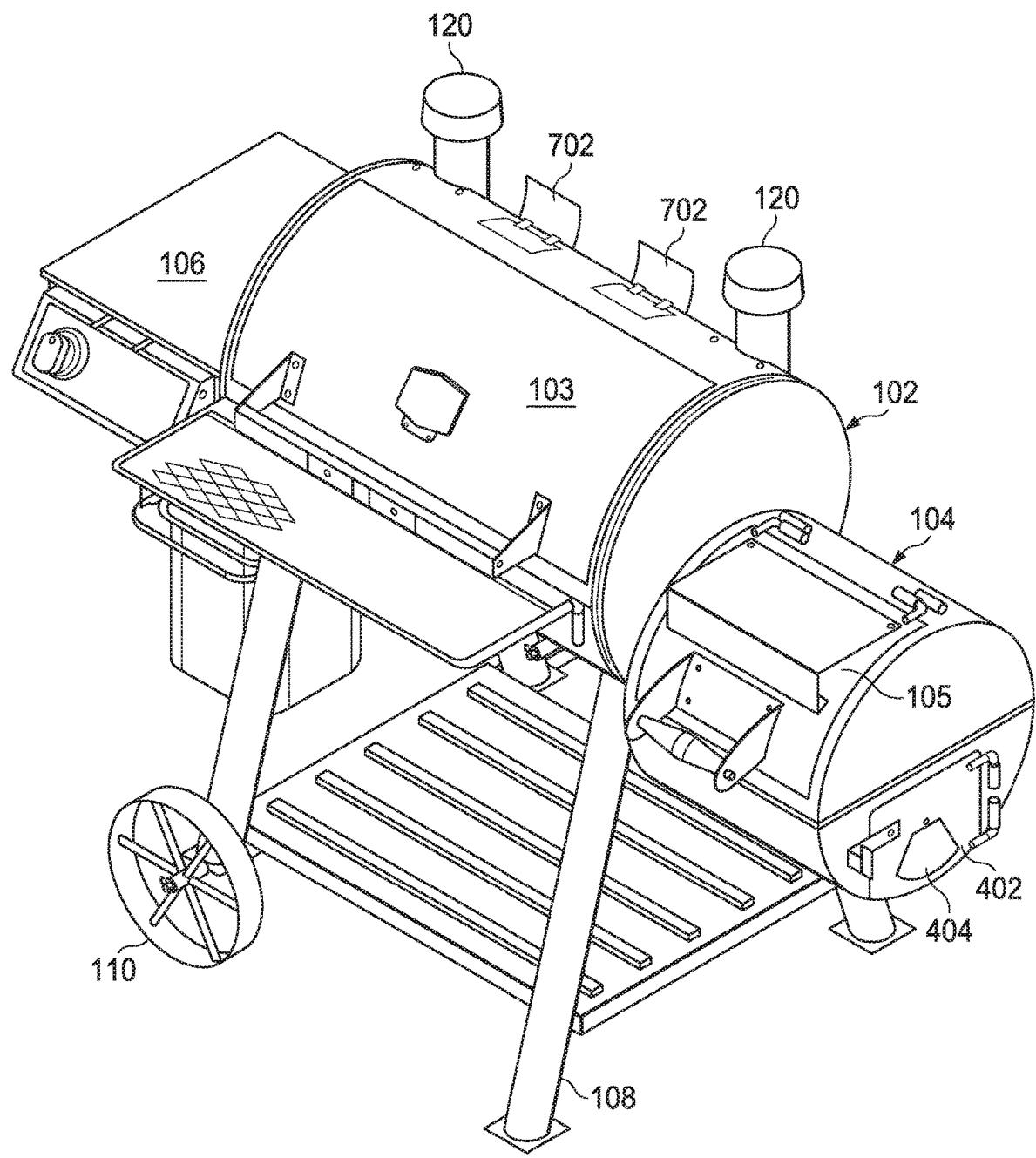
FIG. 8 is a perspective view of the embodiment of FIG. 7 illustrating top vents in an open position.

Referring now to FIG. 7, a perspective view of another embodiment of an enhanced pellet fuel cooking device according 700 according to aspects of the present disclosure is shown. The cooking device 700 is substantially similar in some embodiments to the system 100 described above, but with the addition of one or more top vents 702. The vents 702 may be manually openable by the user in order to decrease pressure within the cooking chamber 102 and/or to increase ventilation through the top thereof while the door 103 may remain closed. FIG. 8 is a perspective view of the embodiment of FIG. 7 illustrating top vents 702 in an open position. In other embodiments, more or fewer vents may be present, and they may be located other than shown. However, locating the vents 702 on or near the top of the cooking chamber 102 may promote the highest degree of air flow through the device 700 utilizing vents of a given size. The number, sizing, and location of vents 702 may serve to further refine airflow characteristics.

In some embodiments, it has been found that simultaneous operation of the pellet feeding fuel source 106 and the fire chamber 104 can result in a pressure imbalance between the cooking chamber 102 and the fire chamber 104 which may have an undesired effect of reducing flow from the fire chamber 104 into the cooking chamber 102. Vents 702 may reduce the internal pressure of the cooking chamber 102 and allow smoke from the fire chamber 104 to enter the cooking chamber 104 and affect the food being cooked. However, when operation at high temperature with only the pellet heat source 106 is desired, reduced pressure in the cooking chamber 102 may not be desirable. Therefore, the vents 702 may be adjustable from at least a fully open position to a fully closed position. In some embodiments, the vents 702 may be adjusted to partially open or closed. The vents 702 may comprise openable, sliding, or rotating doors or damper. In some embodiments, the vents 702 comprise shutter mechanisms. The vents 702 may be provided with screens or other gas/fluid permeable barriers to arrest sparks or other solid materials from exiting the cooking chamber 102.

When only the fire chamber 104 is being used for cooking, the vents 702 may be normally be closed to increase maintain desired temperatures and smoke residence times. The chart below indicates a possible control scheme, but the possibility of intermediate settings of the vents 702 between open and closed may allow finer tuning of operation by an experienced and skilled user.

| Control Scheme for Solid Fuel Device with Adjustable Gas Flow | | | | |
|---|---|---|---|---|
| | Adjustable Port | | Additional Venting | |
| | OPEN | CLOSED | OPEN | CLOSED |
| Pellet Only | | X | | X |
| Fire Chamber Only | X | | | X |
| Pellet + Fire Chamber | X | | X | |

In some embodiments, according to various control schemes, it may be desirable that the opening 502 remain open at all times. In such case, the closing or adjustment mechanism (e.g. FIGS. 6A, 6B, and 6C) might be eliminated. It should also be understood that, although vents 702, adjustable opening 502, and various other adjustable components of the embodiments of the device 100 are shown and discussed as manually operable, the same could be altered to be remotely operable or operable by various automatic or powered means such as motors or actuators. The same might also be controlled by wired controls (e.g., 112) or wireless control mechanisms, possible via an app on a smart phone or other device.

It should also be appreciated that the relative location of the firepot 510 within the cooking chamber 102, the location of the port 502 relative to the firepot and the cooking chamber 102, and the location of the vents 702 (if present) relative to all of these play some role in the movement of smoke and gases through the system 100. As illustrated (e.g., FIG. 5) the firepot 510 is relatively low inside the cooking chamber, and may be below a cooking grate 109 or grates. The port 502 may also be located below a midline (vertically) of the cooking chamber 102 and below cooking grate 109. As shown, the port 502 is approximately vertically equal to the firepot 510, but this may vary somewhat. The fire chamber 104 may be mounted lower than the cooking chamber 102 such that the port 502 connects to the fire chamber relatively higher up on that component. As shown, the port 502 is on an upper portion or upper half of the fire chamber 104 where it joins to the cooking chamber 102. Any vent 404 on the fire chamber may be lower than the port 502 and may be lower than any fuel grate 504 of the fire chamber. Smoke stacks 120 may be mounted or near a top portion of the cooking chamber 102 and may extend upwardly a predetermined distance to increases their ability to draw in combustion gases and move them out of and away from the cooking chamber 102. Vents 702 are also located on or near the top portion of the cooking chamber to reduction of total pressure inside the cooking chamber 102. The described elevations of components relative to one another provides for heated gases and smoke to generally be introduced relatively lower within the cooking chamber 102 and to then be drawn upward and out. As described above, in order to ensure pressure within the cooking chamber resulting from operation of the firepot 510 does not prevent introduction of smoke and gases from the fire chamber 104 into the cooking chamber 102, venting (e.g., vents 702) may be utilized. In some embodiments, the vents 702 are flush or substantially flush with an outer surface of the cooking chamber 102. In other embodiments, the vents 702 may have a structure extending somewhat from the cooking chamber 102 but will terminate lower than the smoke stacks 120.

Various embodiments of the present disclosure are described with respect to use of pellet fuel. However, it should be understood that the fuel need not be in pellet for per se, so long as the fuel is moveable or handleable by hopper and auger operations, and may be ignited and burned within a firepot inside a cooking chamber.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)—(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

The term "selective" or "selectively" means that the operation or function is fully capable of being performed by the structure or device in reference, but the operation or function may not occur continuously or without interruption. Furthermore, a selective operation may be one that the user or operator of a device or method may choose whether or when to perform, but the function or operation is nevertheless fully operative on the relevant device, machine, or method.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A cooking system comprising:
a cooking chamber containing a pellet-fueled firepot;
a cooking grate in the cooking chamber above the firepot;
a fire chamber outside the cooking chamber and held in a fixed relationship with respect to the cooking chamber; and
a user adjustable port below a level of the cooking grate that selectively allows fluid communication from the fire chamber to the cooking chamber.

2. The system of claim 1, further comprising an adjustable exhaust valve on the cooking chamber for promoting or impeding flow of smoke from the fire chamber into the cooking chamber.

3. The system of claim 2, further comprising an adjustable air inlet on the fire chamber.

4. The system of claim 2, further comprising a hopper and selectively operable auger for providing fuel pellets to the pellet-fueled firepot.

5. The system claim 4, further comprising a forced air fan providing combustion air to the firepot.

6. A cooking system comprising:
a cooking chamber;
a pellet-fueled firepot inside the cooking chamber;
a cooking grate above the firepot inside the cooking chamber;
a fire chamber outside the cooking chamber and held in a fixed relationship with respect thereto;
an opening in the cooking chamber, below a level of the cooking grate, allowing fluid communication between the cooking chamber and fire chamber and having a first user adjustable vent for adjustment of the fluid communication; and
a second user adjustable vent on the cooking chamber allowing for reduction of pressure inside the cooking chamber.

7. The system of claim 6, further comprising an adjustable air inlet on the fire chamber.

8. The system of claim 7, further comprising a hopper and selectively operable auger for providing fuel pellets to the firepot.

9. The system of claim 8, further comprising a forced air fan providing combustion air to the firepot.

10. A system comprising:
a cooking chamber;
a cooking grate at a level inside the cooking chamber for supporting food for cooking;
a pellet-fueled firepot inside the cooking chamber below the level of the cooking grate;
a hopper outside the cooking chamber configured to receive pelletized fuel;
an auger that transports pelletized fuel from the hopper to the firepot;
a fire chamber outside the cooking chamber configured to produce smoke by combustion; and
a port between the fire chamber and the cooking chamber allowing fluid flow from the fire box to the cooking chamber;
wherein the port comprises an opening defined in the cooking chamber, the opening being below the level of the cooking grate.

11. The system of claim 10, further comprising an adjustable vent on the port that selectively alters fluid flow from the fire box to the cooking chamber.

12. The system of claim 11, further comprising a forced air fan and a conduit extending into the cooking chamber and supplying forced combustion air to the firepot.

13. The system of claim 12, wherein the port enters the cooking chamber below a cooking grate in the cooking chamber and on an upper portion of the fire box.

14. The system of claim 13, further comprising at least one smoke stack extending upwardly from on or near the top of the cooking chamber that removes smoke and combustion products from the cooking chamber.

15. The system of claim 10, further comprising at least one adjustable top vent on or near a top of the cooking chamber for selectively lowering pressure within the cooking chamber.

16. The system of claim 15, further comprising at least one smoke stack extending from the cooking chamber and terminating at a level above the at least one adjustable top vent.

17. The system of claim 16, wherein the fire chamber defines an air inlet vent on an outside thereof and below the port.

18. The system of claim 17, further comprising a fuel grate in the fire chamber situated above at least a portion of the air inlet vent and below at least a portion of the port.

\* \* \* \* \*